No. 741,686. PATENTED OCT. 20, 1903.
N. LOMBARD.
SPEED CHANGING DEVICE.
APPLICATION FILED MAR. 3, 1903.
NO MODEL. 2 SHEETS—SHEET 1.

Witnesses:
Edw. C. Cleveland
Josiah E. Reid

Inventor:
Nathaniel Lombard,
by Walter E. Lombard,
Atty.

No. 741,686. PATENTED OCT. 20, 1903.
N. LOMBARD.
SPEED CHANGING DEVICE.
APPLICATION FILED MAR. 3, 1903.
NO MODEL. 2 SHEETS—SHEET 2.

Witnesses:
Edna C. Cleveland
Josiah E. Reid

Inventor:
Nathaniel Lombard,
by Walter E. Lombard
Atty.

No. 741,686. Patented October 20, 1903.

UNITED STATES PATENT OFFICE.

NATHANIEL LOMBARD, OF BROOKLINE, MASSACHUSETTS.

SPEED-CHANGING DEVICE.

SPECIFICATION forming part of Letters Patent No. 741,686, dated October 20, 1903.

Application filed March 3, 1903. Serial No. 145,935. (No model.)

*To all whom it may concern:*

Be it known that I, NATHANIEL LOMBARD, a citizen of the United States of America, and a resident of Brookline, in the county of Norfolk and State of Massachusetts, have invented certain new and useful Improvements in Speed-Changing Devices, of which the following is a specification.

This invention relates to speed-changing devices, and has for its object the production of a device of this nature which may be used on automobiles and for similar purposes which will be effective in operation, economical in construction, obviate the necessity of using clutches, and make unnecessary the throwing of the gears in and out of mesh, as is now done in many devices of this kind, which has been found in practice to be very objectionable.

It consists in certain combinations of elements and arrangements of parts, which will be readily understood by reference to the description of the drawings and to the claims to be hereinafter given.

Figure 1:
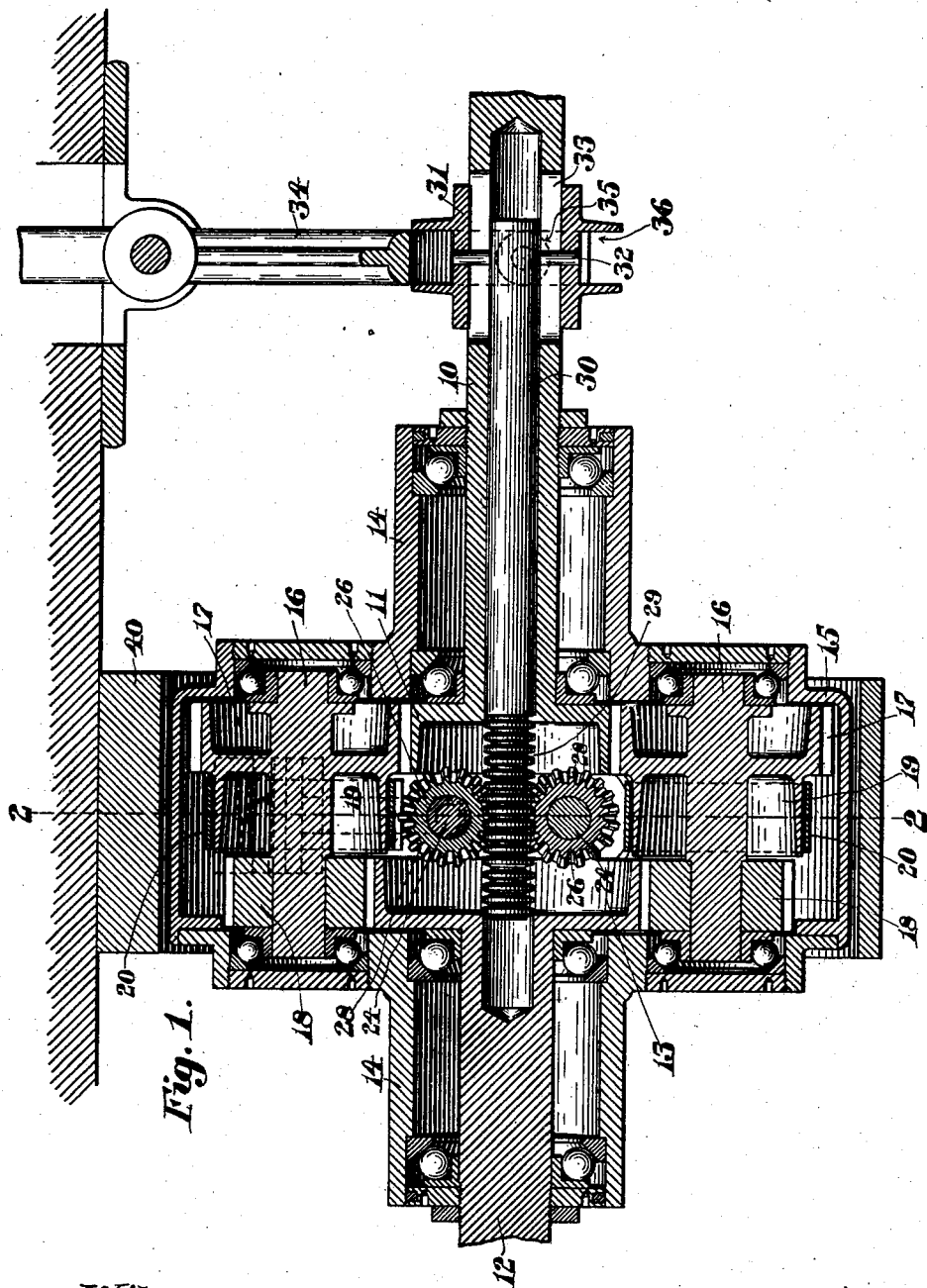
Figure 2:
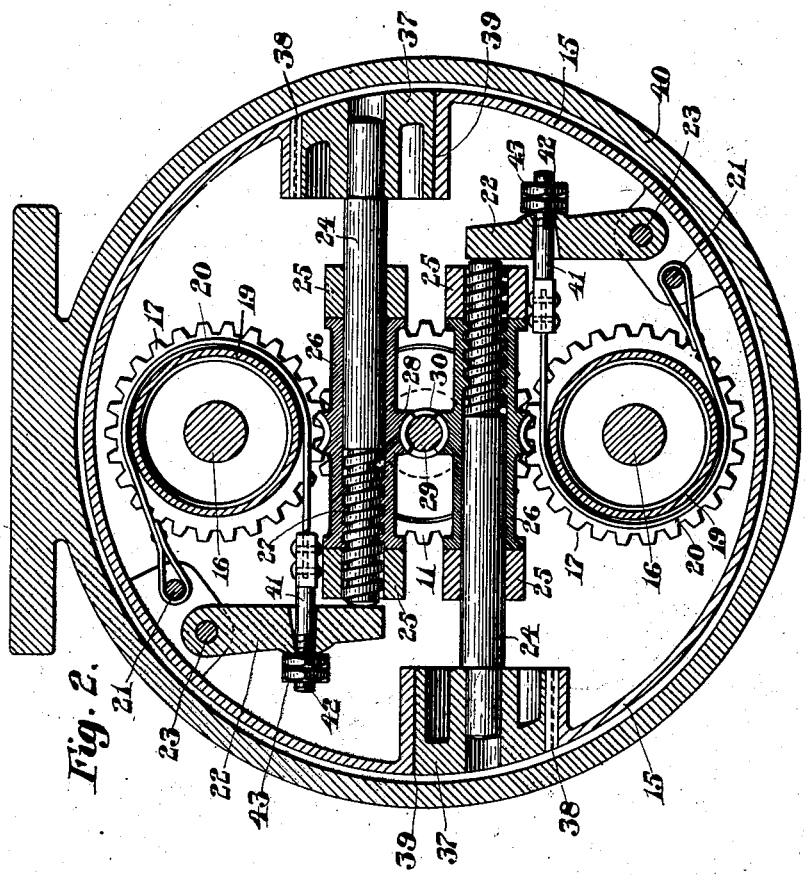

Of the drawings, Figure 1 represents a sectional elevation of a speed-changing device embodying this invention. Fig. 2 represents a sectional elevation of the same on line 2 2 on Fig. 1.

Similar characters refer to like parts in both figures of the drawings.

In the drawings, 10 is an actuating-shaft, which may be connected with any suitable motive power and which is provided with a gear 11, formed thereon or secured thereto, as may be desired. In axial line with said actuating-shaft 10 is a shaft 12 to be driven, which may be connected with any suitable device to which it is desired to transmit power. The driven shaft 12 is also provided with a gear 13, which may be formed on or secured to said shaft. Outside of said gears 11 and 13 is mounted upon said shafts 10 12 a suitable casing or housing 14, the main portion 15 of which is cylindrical in shape and is provided with bearings of any suitable nature for the short shaft 16, which is provided with a gear 17, meshing into the gear 11, and also with a gear 18, which meshes with the gear 13 upon the driven shaft 12. The gear 17 is provided with a drum 19, which is partially surrounded by a brake-band 20, secured at 21 to the enlarged portion 15 of said casing. The opposite end of said brake-band 20 is adjustably secured to the lever 22, pivoted at 23 to the casing 15. Against the free end of the pivoted lever 22 the threaded rod 24 coacts for the purpose of clamping said gear 17 when it is desired to prevent the same from revolving. The rod 24 is mounted in bearings 25, forming a part of said casing, and is surrounded by a sleeve 26, which is provided with a female screw-thread 27, which engages with the threaded portion of said rod 24. The sleeve 26 while revolving is prevented from lateral movement by the bearings 25. The sleeve 26 is provided with a pinion 28, which meshes with the annular grooves 29 of a rod 30, mounted in bearings in the actuating-shaft 10. Surrounding said actuating-shaft 10 and outside of said casing 14 is a grooved collar 31, secured to the rod 30 by means of a pin 32, projecting through slots 33 in said actuating-shaft. The collar 31 is moved lengthwise of said actuating-shaft 10 by means of a lever 34, provided with a truck 35, projecting into the groove 36 of said collar 31. The rod 24 is provided at its outer end with a plunger 37, keyed at 38 to a cylindrical bearing 39 in said casing 15, in which it is free to be moved when the sleeve 26 is revolved about the rod 24. The outer face of said plunger 37 conforms to the periphery of the casing 15, which is encircled by a fixed ring 40, which may be secured to any fixed point.

The gears 11 and 17 are preferably made of the same size, while the gears 18 and 13 are preferably made of a smaller and larger diameter in order to obtain a variation in speed for the driving-shaft 12 when desired. In the drawings the gears are shown of such a size that when the motion is transmitted from the actuating-shaft to the driven shaft through the gears 11, 17, 18, and 13 a speed will be communicated to the driven shaft of one-half of the actuating-shaft. It is obvious, however, that the sizes of the gears may be varied to secure any variation in speed which may be desired. It is also obvious that while in the drawings two gears 17 and 18 are shown to transmit the motion from the gear 11 to the gear 13 a single gear of two diameters might be used equally as well. The clamping-band 20, which coacts with the drum 19, is secured to a rod 41, passing through the pivoted lever 22 and provided with a threaded portion 42, upon which are mounted nuts 43, by the adjustment of which the friction of the clamping-band 20 upon its drum 19 may be varied.

It is obvious that a speed-changing device could be constructed and operate satisfactorily with a single train of gearing connecting the actuating and driven shafts and with a single set of devices for changing the condition of affairs, as has been described; but it is obvious that in order to have a perfectly-balanced device it is preferable to have the various parts duplicated, as here shown in the drawings.

As shown in the drawings, the casing 14 is mounted upon the actuating and driven shafts by means of ball-bearings and the shafts 16, carrying the gears 17 and 18, are also mounted in ball-bearings in the enlarged portion 15 of the casing; but it is obvious that the various devices might be arranged with ordinary bearings and would work nearly as well.

The operation of the device is as follows: The lever 34 being in the position as shown in Fig. 1 and power being transmitted to the actuating-shaft 10, the casing 14 and the gears 17 and 18 would each be free to revolve about their axes, and as a result no motion would be transmitted from the actuating-shaft 10 to the driven shaft 12. If, however, it is desired to transmit the same speed from the actuating-shaft to the driven shaft, the collar 31 is moved by means of the lever 34 lengthwise of the actuating-shaft 10 in a direction toward the left of Fig. 1, thereby moving therewith the grooved rod 30 and causing a rotation of the geared sleeves 26 about the rod 24. This movement through the coacting screw-threads upon said sleeve 26 and said rod 24 will cause the rod 24 to be moved against the free ends of the pivoted lever 22, thereby clamping the gears 17 through the clamping-band 20, thus preventing the gears 17 from revolving about their axes. Owing to the fact that the gears 17 and 18 are thus clamped so that they cannot revolve, any motion transmitted through the actuating-shaft will cause the casing 14 15 to revolve with said actuating-shaft, and owing to the fact that the gear 18 is prevented from revolving its teeth will lock into the gear 13 and cause that and its driven shaft to revolve at the same speed that the actuating-shaft is revolved. If, however, it is desired that the driven shaft be driven at one-half the speed of the actuating-shaft, the collar 31 is moved by means of the lever 34 in the opposite direction, in which case the grooved rod 30 will cause the geared sleeves 26 to revolve in such a direction as to release all pressure upon the pivoted lever 22, and thereby permit the friction of the clamping-band 20 to be withdrawn from the drums 19 and allow the gears 17 and 18 to freely revolve, while at the same time the plunger 37 is pressed firmly against the encircling ring 40, which surrounds the casing 15, and thereby clamps said casing to said pivoted lever and prevents further rotation thereof. When the casing has been thus clamped, the gears 17 18 will be permitted to freely revolve, and any motion of the shaft 10 will be transmitted through the gears 11 and 17 and thence through the gears 18 and 13 to the driven shaft 12, revolving the latter at a speed one-half as great as the actuating-shaft.

While the rod 30 is shown as mounted within the actuating-shaft, it is obvious that said rod might be equally as well mounted within said driven shaft without affecting the principles of this invention.

This makes a very effective speed-changing device, and all the working parts being wholly inclosed within a casing they are not liable to be injured or become clogged.

One great advantage of this speed-changing device is that by means of its construction the speed may be safely and readily changed at any time while the motor is in operation without jar or clash inasmuch as the gears are continually in mesh. This does away with the necessity of throwing the gears in and out of mesh, as is often done in speed-changing devices now in use, and which has been found in practice to be very objectionable and often unsafe. It also obviates the necessity of using clutches of any nature, thus obtaining a smooth-running speed-changing device which will run as smoothly and quietly while the speed is being varied as at any other time during its operation.

Having thus described my invention, I claim—

1. In a speed-changing device, the combination of an actuating-shaft, a driven shaft, a train of gears connecting said shafts, a clamping mechanism for said gears, a rod within one of said shafts, means for operating said rod, and mechanism interposed between said rod and said clamping mechanism and operating the latter.

2. In a speed-changing device, the combination of an actuating-shaft, a driven shaft, a train of gears connecting said shafts, a clamping mechanism for said gears, a rod located within one of said shafts, means for operating said rod, a series of grooves encircling said rod, and mechanism operable by said grooved rod and connected with said gear-clamping mechanism.

3. In a speed-changing device, the combination of an actuating-shaft, a driven shaft, a train of gears connecting said shafts, a clamping device for said gears, a rod located within one of said shafts provided with a series of annular grooves, a geared sleeve meshing with and operated by said grooved rod and provided with an internally-threaded portion, a threaded rod within said sleeve, and mechanism interposed between said threaded rod and said gear-clamping mechanism.

4. In a speed-changing device, the combination of an actuating-shaft, a driven shaft, a train of gears connecting said shafts, a clamping device for said gears, a grooved rod located within one of said shafts, a geared sleeve meshing with and operated by said grooved rod and provided with an internally-threaded portion, a threaded rod within said sleeve and a pivoted lever to which the gear-clamping mechanism is secured and against the free end of which the said threaded rod coacts.

5. In a speed-changing device, the combination of an actuating-shaft, a driven shaft, a gear upon said actuating-shaft, a gear upon said driven shaft, intermediate gearing meshing with said gears, a clamping device for said intermediate gearing, a grooved rod located within one of said shafts, a geared sleeve meshing with and operated by said grooved rod and provided with an internally-threaded portion, a threaded rod within said sleeve and a pivoted lever to which the gear-clamping mechanism is secured and against the free end of which said threaded rod coacts.

6. In a speed-changing device, the combination of an actuating-shaft, a driven shaft, a gear upon said actuating-shaft, a gear upon said driven shaft, intermediate gearing meshing with said gears, a clamping-drum secured to said intermediate gearing, a clamping-band coacting with said drum, a grooved rod located within one of said shafts, a geared sleeve meshing with and operated by said grooved rod and provided with an internally-threaded portion, a threaded rod within said sleeve, and a pivoted lever to which the gear-clamping mechanism is secured and with the free end of which said threaded rod coacts.

7. In a speed-changing device, the combination of an actuating-shaft, a driven shaft, a gear upon said actuating-shaft, a gear on said driven shaft, intermediate gearing meshing with said gears, a casing mounted upon said shafts and provided with bearings for said intermediate gearing, a clamping mechanism for said intermediate gearing, a rod located within one of said shafts, means for operating said rod, and mechanism interposed between said rod and said clamping mechanism and operating the latter.

8. In a speed-changing device, the combination of an actuating-shaft, a driven shaft, a gear upon said actuating-shaft, a gear upon said driven shaft, intermediate gearing meshing with said gears, a casing mounted upon said shafts and provided with bearings for said intermediate gearing, a clamping mechanism for said intermediate gearing, a rod located within one of said shafts, means for operating said rod, a series of grooves encircling said rod, and mechanism operable by said grooved rod and connected with said gear-clamping mechanism.

9. In a speed-changing device, the combination of an actuating-shaft, a driven shaft, a gear upon said actuating-shaft, a gear upon said driven shaft, intermediate gearing meshing with said gears, a casing mounted upon said shafts and provided with bearings for said intermediate gearing, a clamping device for said intermediate gearing, a rod located within one of said shafts and provided with a series of annular grooves, a geared sleeve, meshing with and operated by said grooved rod and provided with an internally-threaded portion, a threaded rod within said sleeve, and mechanism interposed between said threaded rod and the gear-clamping mechanism.

10. In a speed-changing device, the combination of an actuating-shaft, a driven shaft, a gear upon said actuating-shaft, a gear upon said driven shaft, intermediate gearing meshing with said gears, a casing mounted upon said actuating and driven shafts and provided with bearings for said intermediate gearing, a grooved rod located within one of said shafts, a geared sleeve meshing with and operated by said grooved rod and provided with an internally-threaded portion, a threaded rod within said sleeve, and a pivoted lever to which the gear-clamping mechanism is secured and with the free end of which said threaded rod coacts.

11. In a speed-changing device, the combination of an actuating-shaft, a driven shaft, a gear upon said actuating-shaft, a gear upon said driven shaft, intermediate gearing meshing with said gears, a casing mounted upon the actuating and driven shafts and provided with bearings for said intermediate gearing, a clamping-drum secured to said intermediate gearing, a lever pivoted to said casing, a clamping-band coacting with said drum and having one end secured to said casing and the other to said pivoted lever, a grooved rod located within one of said shafts, a geared sleeve meshing with and operated by said grooved rod and provided with an internally-threaded portion, a threaded rod within said sleeve, and means for operating said rod.

12. In a speed-changing device, the combination of an actuating-shaft, a driven shaft, a gear upon said actuating-shaft, a gear upon said driven shaft, a gear meshing with the gear on the actuating-shaft and provided with a clamping-drum, a second gear mounted upon the shank of the last-mentioned gear and meshing with the gear upon the said driven shaft, a casing mounted upon the actuating and driven shafts and provided with bearings for said intermediate gears, a lever pivoted to said casing, a clamping-band coacting with said drum and having one end secured to said casing and the other to said pivoted lever, a grooved rod located within one of said shafts, a geared sleeve meshing with and operated by said grooved rod and provided with an internally-threaded portion, a threaded rod within said sleeve and means for operating said rod.

13. In a speed-changing device, the combination of an actuating-shaft, a driven shaft, gearing connecting said shafts, a rod located within one of said shafts, means for operating said rod, a casing mounted upon said shafts, a ring encircling said casing, a plunger located in bearings in said casing and adapted to engage with said encircling ring and mechanism interposed between said operating-rod and said plunger to force said plunger into contact with said encircling ring.

14. In a speed-changing device, the combination of an actuating-shaft, a driven shaft, gearing connecting said shafts, a grooved rod located within one of said shafts, means for operating said rod, a casing mounted upon said shafts, a ring encircling said casing, a geared sleeve meshing with the grooves in said rod and provided with a threaded portion, a threaded rod mounted in said sleeve, and a plunger mounted upon the end of said threaded rod and projecting through bearings in said casing and adapted to engage with said encircling ring.

15. In a speed-changing device, the combination of an actuating-shaft, a driven shaft, gearing connecting said shafts, a clamping device for said gearing, a rod located within one of said shafts, means for operating said rod, a casing mounted upon said shafts, a ring encircling said casing, a geared sleeve meshing with the grooves in said rod and provided with a threaded portion, a threaded rod mounted in said sleeve, a plunger secured to the end of said rod and mounted in a bearing in said casing, a clamping device for said gearing and mechanism interposed between said clamping device and said threaded rod.

16. In a speed-changing device, the combination of an actuating-shaft, a driven shaft, a train of gears connecting the said shafts, a clamping mechanism for said gears, a rod located within one of said shafts, means for operating said rod, a casing mounted upon said actuating and driven shafts, a ring encircling said casing, a plunger mounted in said casing and adapted to engage said encircling ring, and mechanism interposed between said plunger and said gear-clamping mechanism and said operating-rod.

17. In a speed-changing device, the combination of an actuating-shaft, a driven shaft, a train of gears connecting said shafts, a clamping mechanism for said gears, a rod located within one of said shafts, means for operating said rod, a casing mounted upon said actuating and driven shafts, a ring encircling said casing, a plunger mounted in a bearing in said casing and adapted to engage said encircling ring, and mechanism operable by said grooved rod and connected with said gear-clamping mechanism and said plunger.

18. In a speed-changing device, the combination of an actuating-shaft, a driven shaft, a train of gears connecting said shafts, a clamping device for said gears, a casing mounted upon said actuating and driven shafts, a ring encircling said casing, a rod located within one of said shafts and provided with a series of annular grooves, a geared sleeve meshing with and operated by said grooved rod and provided with an internally-threaded portion, a threaded rod within said sleeve, a plunger secured to one end of said rod and adapted to engage said encircling ring through an opening in said casing and mechanism interposed between said threaded rod and the gear-clamping mechanism.

19. In a speed-changing device, the combination of an actuating-shaft, a driven shaft, a train of gears connecting said shafts, a clamping device for said gears, a casing mounted upon said shafts, a fixed ring encircling said casing, a grooved rod located within one of said shafts, a geared sleeve meshing with and operated by said grooved rod and provided with an internally-threaded portion, a threaded rod within said sleeve, a plunger secured to one end of said rod and mounted in bearings in said casing and a pivoted lever to which the gear-clamping mechanism is secured and with the free end of which said threaded rod coacts.

20. In a speed-changing device, the combination of an actuating-shaft, a driven shaft, a gear on said actuating-shaft, a gear on said driven shaft, a casing mounted upon said shafts, a fixed ring encircling said casing, intermediate gearing meshing with the gears on said actuating and driven shafts and having bearings in said casing, a clamping device for said gearing, a grooved rod located within one of said shafts, a geared sleeve meshing with and operated by said grooved rod and provided with an internally-threaded portion, a threaded rod within said sleeve, and a pivoted lever to which the gear-clamping mechanism is secured and with the free end of which said threaded rod coacts.

21. In a speed-changing device, the combination of an actuating-shaft, a driven shaft, a casing mounted upon said shafts, a fixed ring encircling said casing, a gear upon said actuating-shaft, a gear upon said driven shaft, intermediate gearing having bearings in said casing and meshing with the gears on said actuating and driven shafts and provided with a clamping-drum, a clamping-band coacting with said drum, a grooved rod located within one of said shafts, a geared sleeve meshing with and operated by said grooved rod and provided with an internally-threaded portion, a threaded rod within said sleeve, a plunger secured to one end of said rod and adapted to engage with said fixed ring through openings in said casing, and a pivoted lever to which the clamping-band is secured and with the free end of which the said threaded rod coacts.

22. In a speed-changing device, the combination of an actuating-shaft, a driven shaft a casing mounted on said actuating and driven shafts, a fixed ring encircling said casing, a gear on said actuating-shaft, a gear on said driven shaft, intermediate gearing mounted in bearings in said casing and meshing with said gears on said actuating and driven shafts, a clamping-drum secured to said intermediate gearing, a lever pivoted to said casing, a clamping-band coacting with said drum and secured at one end to said casing and at the other to said pivoted lever, a grooved rod located within one of said shafts, a geared sleeve meshing with and operated by said grooved rod and provided with an internally-threaded portion, a threaded rod within said sleeve, a plunger secured to the end of said rod mounted in bearings in said casing and adapted to engage with said fixed ring, and mechanism for operating said grooved rod to actuate said clamping-band.

23. In a speed-changing device, the combination of an actuating-shaft, a driven shaft, a gear on each of said shafts, intermediate gearing connecting said gears, a casing loosely mounted upon said shafts and inclosing said gears, a fixed ring encircling said casing, and mechanism located within said casing for clamping the same to said fixed ring and permitting said intermediate gearing to freely revolve or to permit said casing to freely revolve while said intermediate gearing is prevented from revolving.

24. In a speed-changing device, the combination of an actuating-shaft, a driven shaft, a casing mounted on said shafts, a fixed ring encircling said casing, mechanism located within said casing for transmitting a varying speed from the actuating-shaft to the driven shaft, and mechanism located within one of the shafts for regulating the speed-changing mechanism.

25. In a speed-changing device, the combination of an actuating-shaft, a driven shaft, a gear on each of said shafts, intermediate gearing connecting said gears, a casing loosely mounted upon said shafts, a fixed ring encircling said casing, mechanism for clamping said casing to said ring, mechanism for preventing said intermediate gearing from revolving, and means for operating the casing-clamping mechanism or the gear-clamping mechanism or preventing either of these mechanisms from acting.

26. In a speed-changing device, the combination of an actuating-shaft, a driven shaft, a gear on each of said shafts, intermediate gearing connecting said gears, a casing loosely mounted upon said shafts, a fixed ring encircling said casing, mechanism for clamping said casing to said ring, mechanism for preventing said intermediate gearing from revolving, and means located within one of the shafts for operating either the casing-clamping mechanism or the gear-clamping mechanism or preventing either of these mechanisms from acting.

27. In a speed-changing device, the combination of an actuating-shaft, a driven shaft, a gear on each of said shafts, intermediate gearing connecting said gears, a casing loosely mounted upon said shafts and inclosing said gears, a fixed ring encircling said casing, and mechanism located within said casing for clamping said casing to said fixed ring.

28. In a speed-changing device, the combination of an actuating-shaft, a driven shaft, a gear on each of said shafts, intermediate gearing connecting said gears, a casing loosely mounted upon said shafts, a fixed ring encircling said casing, and mechanism for clamping said casing to said fixed ring and permitting said intermediate gear to freely revolve or to permit said casing to freely revolve while said intermediate gearing is prevented from revolving, or to permit said intermediate gear to revolve while the casing is freely revolving about said supporting-shafts.

29. In a speed-changing device, the combination of an actuating-shaft, a driven shaft, a gear on each of said shafts, intermediate gearing connecting said gears, a casing loosely mounted upon said shafts, a fixed ring encircling said casing, and mechanism located within said casing for clamping said casing to said fixed ring and permitting said intermediate gearing to freely revolve or to permit said casing to freely revolve while said intermediate gearing is prevented from revolving.

30. In a speed-changing device, the combination of an actuating-shaft, a driven shaft, a gear on each of said shafts, intermediate gearing connecting said gears, a casing loosely mounted upon said shafts, a fixed ring encircling said casing, and mechanism located within said casing for clamping said casing to said fixed ring and permitting said intermediate gearing to freely revolve or to permit said casing to freely revolve while said intermediate gearing is prevented from revolving, or to permit said intermediate gearing to revolve while the casing is freely revolved about said supporting-shafts.

31. In a speed-changing device, the combination of an actuating-shaft, a driven shaft, a gear on each of said shafts, intermediate gearing connecting said gears, a casing loosely mounted upon said shafts, mechanism located within said casing for clamping said intermediate gearing and preventing it from revolving, and means located within one of said shafts for operating said clamping mechanism.

32. In a speed-changing device, the combination of an actuating-shaft, a driven shaft, a gear on each of said shafts, intermediate gearing connecting said gears, a casing loosely mounted upon said shafts, a fixed ring encircling said casing, mechanism for clamping said casing to said fixed ring and means located within one of said shafts for operating said clamping mechanism.

33. In a speed-changing device, the combination of an actuating-shaft, a driven shaft, a gear on each of said shafts, intermediate gearing connecting said gears, a casing loosely mounted upon said shafts and mechanism located within said casing for clamping said intermediate gearing and preventing it from revolving.

34. In a speed-changing device, the combination of an actuating-shaft, a driven shaft, a gear on each of said shafts, intermediate gearing connecting said gears, mechanism located within said casing for clamping said intermediate gearing and preventing it from revolving, a casing loosely mounted upon said shafts, a fixed ring encircling said casing, mechanism for clamping said casing to said fixed ring and means located within one of said shafts for operating said clamping mechanism.

Signed by me at Boston, Massachusetts, this 21st day of February, 1903.

NATHANIEL LOMBARD.

Witnesses:
WALTER E. LOMBARD,
EDNA C. CLEVELAND.